United States Patent [19]
Keller

[11] Patent Number: 5,835,161
[45] Date of Patent: Nov. 10, 1998

[54] KINESCOPE DRIVER APPARATUS WITH GAMMA CORRECTION COUPLED WITH FEEDBACK CATHODE CURRENT SENSOR

[75] Inventor: Anton Werner Keller, Zurich, Switzerland

[73] Assignee: RCA Thomson Licensing Corporation, Princeton, N.J.

[21] Appl. No.: 804,848

[22] Filed: Feb. 24, 1997

Related U.S. Application Data

[63] Continuation of Ser. No. 587,044, Jan. 12, 1996, abandoned, which is a continuation of Ser. No. 234,026, Apr. 28, 1994, abandoned.

[51] Int. Cl.$^6$ ................................................ H04N 9/69
[52] U.S. Cl. .......................... 348/674; 348/671; 348/379
[58] Field of Search ................................ 384/674, 254, 384/805, 806, 808, 809, 810, 811, 687, 686, 678, 673, 379; 358/164, 32; 348/671; H04N 5/202, 5/20, 9/69

[56] References Cited

U.S. PATENT DOCUMENTS

| | | | |
|---|---|---|---|
| 3,823,264 | 7/1974 | Haferl | 348/707 |
| 4,096,517 | 6/1978 | Hinn | 358/40 |
| 4,118,731 | 10/1978 | Hinn . | |
| 4,209,808 | 6/1980 | Harwood | 358/243 |
| 4,263,622 | 4/1981 | Hinn | 348/691 |
| 4,482,921 | 11/1984 | Filliman | 358/243 |
| 4,484,229 | 11/1984 | Parker | 348/379 |
| 4,494,146 | 1/1985 | Naimpally et al. | 358/184 |
| 4,536,800 | 8/1985 | Parker | 358/243 |
| 4,589,022 | 5/1986 | Prince et al. | 348/674 |
| 4,642,696 | 2/1987 | George | 348/380 |
| 4,660,083 | 4/1987 | Allen | 358/168 |
| 4,698,557 | 10/1987 | Harlos | 348/687 |
| 4,745,464 | 5/1988 | Gronau et al. | 348/805 |
| 4,858,015 | 8/1989 | Furrey | 358/242 |
| 5,083,198 | 1/1992 | Haferl et al. | 358/32 |
| 5,282,039 | 1/1994 | Vilard | 348/805 |
| 5,317,240 | 5/1994 | Keller | 315/383 |
| 5,345,267 | 9/1994 | Flickner | 348/379 |
| 5,410,222 | 4/1995 | Flickner | 348/379 |

FOREIGN PATENT DOCUMENTS

| | | | |
|---|---|---|---|
| 196 694 | 10/1986 | European Pat. Off. . | |
| 575 824 A2 | 12/1993 | European Pat. Off. | H04N 9/69 |
| 37 06 835 A1 | 9/1988 | Germany | H04N 5/14 |
| 124017 | 10/1978 | Japan | 358/164 |
| 206375 | 9/1986 | Japan | H04N 5/202 |
| 1191650 | 5/1970 | United Kingdom | H03F 5/14 |

*Primary Examiner*—Chris Grant
*Attorney, Agent, or Firm*—Joseph S. Tripoli; Peter M. Emanuel; Robert D. Shedd

[57] ABSTRACT

An amplifier (60) provides an amplified video signal in response to a video input signal supplied thereto. A cathode current sensor (Q3), couples an output of the amplifier to the cathode of a kinescope (20) and also provides an output current (Ik) proportional to the kinescope cathode current. A feedback path (82) applies a portion of the sensed cathode current provided by the cathode current sensor to a circuit node (65 or 63) in the amplifier for imparting gamma correction to images produced by the kinescope. In one application the cathode current is apportioned (Q3, Q5) to provide gamma correction for the kinescope and to provide automatic kinescope bias (AKB) control.

4 Claims, 6 Drawing Sheets

KINESCOPE DRIVER APPARATUS WITH GAMMA CORRECTION COUPLED WITH FEEDBACK CATHODE CURRENT SENSOR

This is a continuation of application Ser. No. 08/587,044 filed Jan. 12, 1996 now abandoned which is a continuation of 234,026 filed Apr. 28, 1994, now abandoned.

FIELD OF THE INVENTION

This invention relates to television systems generally and particularly to kinescope cathode driver apparatus with provisions for providing gamma correction.

BACKGROUND OF THE INVENTION

Figure 1:
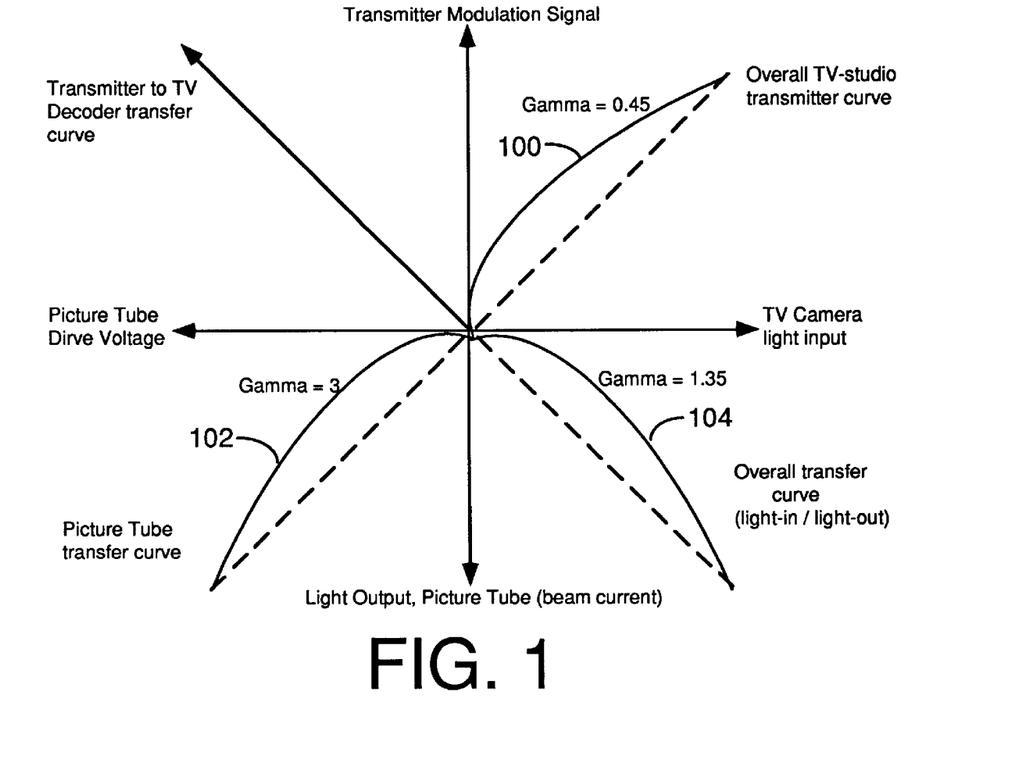
FIG. 1 is a diagram showing exemplary transfer characteristics and gamma values for a television transmitter, a television receiver and the overall television system including the transmitter and receiver.

In an ideal television system the light output produced by a kinescope would be linearly related to the light applied to a camera pick-up tube. In practical systems, neither the camera tube or the display tube are linear devices. In other words, the signal voltage produced by a camera tube is not linearly related to the light that is detected and the light produced by a kinescope is not linearly related to the cathode drive voltage applied to it. The relationship between light input and signal output for the camera tube, and the relationships between signal input and light output of the picture tube, are both commonly expressed by the term "gamma" which, simply stated, is the exponent or "power" to which an input function (X) is raised to produce an output function (Y). If, for example, an input function X is raised to the first power (gamma =1) to produce an output function, then the two functions are said to be linearly related. If the output varies as the square of the input function, the value of the exponent (gamma) is equal to "2". If the output varies as the square root of the input function, the "gamma" or exponent equals 0.5. Gamma, in other words, is simply a measure of curvature of a transfer function, FIG. 1 shows the gamma of various aspects of a video signal transmission system, with curve 100 representing the transfer characteristic of the transmission side, curve 102 representing the transfer characteristic of the picture tube (kinescope or "CRT" ), and curve 104 representing the overall transfer characteristic. The transmitted video signals of the NTSC, PAL and SECAM television standards have a gamma of about 0.45 to 0.5 while the picture tube (kinescope) of color television receivers have a gamma of about 2.8 to 3.1. As a result, the overall transfer curve (light into the camera to light output from the picture tube) is not linear and the overall gamma is, in practice about 1.35 instead of a unity (1.0) gamma. This implies that the exponential transfer characteristic of the picture tube is not fully compensated, leading to compression of dark picture portions of the display. Such compression causes picture details near black to be lost, and colored areas to fade to black. Concurrently, whites are excessively amplified with respect to the dark portions to the point of often reaching picture tube saturation and blooming.

A linear overall transfer characteristic avoids the problem of black compression and can be obtained by an additional gamma correction of about 0.8 in each of the red, green, and blue (R, G and B) signal processing circuits in the television receiver. Increasing the gain in this region, however, requires gain compression at white levels. However, picture tubes have a relatively small dynamic range of light output which can not be enlarged without reaching picture tube saturation causing blooming. Therefore, gamma correction to increase amplification of dark image areas can cause a signal compression of the high signal whites. This effect may be overcome by boosting the high frequency content (image detail) of relatively bright image areas.

There are, generally speaking, two conventional approaches to gamma correction with detail enhancement. One approach is to apply non-linear processing to the video signal in the driver circuitry as exemplified, for example, by Haferl et al. in U.S. Pat. No. 5,083,198 which issued Jan. 21, 1992. In an embodiment of the Haferl et al. apparatus, a video signal is divided into low and high amplitude portions, the latter are high pass filtered and then the original video signal, the low amplitude portion and the high pass filtered high amplitude portion are combined for application to a kinescope. Images displayed include gamma correction for black to gray picture areas and boosted detail for gray to white picture areas.

The other approach to gamma correction is to apply linear processing to the video signal and rely upon the non-linear impedance characteristics of the kinescope cathode for gamma correction as exemplified, for example, by Furrey in U.S. Pat. No. 4,858,015 which issued Aug. 15,1989. In an embodiment of the Furrey apparatus a video signal is linearly amplified in a cascode amplifier. The amplifier output impedance is reduced by coupling the amplifier load resistor to the input of a voltage follower amplifier comprising a cascade complementary emitter follower buffer amplifier. The output of the voltage follower amplifier is coupled to the kinescope cathode via a parallel connection of a resistor and a capacitor. The resistor, in combination with the non-linear resistive portion of the cathode impedance, provides gamma correction. However, the resistor, in combination with the stray capacitance of the cathode, creates an undesirable frequency response pole at a relatively low frequency (i.e., it acts as a low pass filter). This tends to reduce the high frequency detail of displayed images. The inclusion of a by-pass capacitor in parallel with the resistor tends to restore the high frequency response by by-passing high frequency components around the gamma correction resistor. The complementary emitter follower (buffer) amplifier provides a low impedance source for driving the by-pass capacitor.

SUMMARY OF THE INVENTION

In the two approaches to gamma correction described above, the second or "linear" processing approach, relying on the actual non-linearities of the kinescope, has the virtue of relative simplicity, economy and improved reliability (due to requiring fewer circuit elements). Also, this approach is very flexible requiring only a resistor value change to compensate for differences in the non-linearities of the three cathode electrodes in a color kinescope.

The present invention resides, in part, in the recognition that a need exists for further simplification in providing gamma correction over that provided by the "second" approach discussed above while still retaining the advantage of not requiring non-linear circuit elements in the driver amplifier, Advantageously, kinescope driver apparatus in accordance with the present invention provides gamma correction without use of either the relatively high valued series coupled output resistors required in the "second" approach described above or the associated by-pass capacitors for correcting low-frequency pole compensation caused by use of such relatively high valued resistors.

Kinescope driver apparatus (50) embodying the invention includes a linear amplifier (60) having an input for receiving a video input signal an output for providing an amplified video signal. A current sensor (Q3) couples the output of the amplifier to the cathode (K 1) of a kinescope (20), the sensor providing an output current (Ik) linearly related to the cathode current of the kinescope. A feedback path (82) applies at least a portion of the output current provided by the cathode current sensor to a circuit node (65 or 63) in the amplifier for imparting gamma correction to images produced by the kinescope (20).

Advantageously, the current provided by the cathode current sensor may apportioned into two or more portions with one portion being directed to the circuit node (65 or 63) in the amplifier for providing gamma correction and another portion (Iakb) being directed to automatic kinescope bias circuitry.

In a specific application of the principles of the invention, the sensed cathode current is applied to the emitter electrode of the input transistor of a cascode amplifier. In another example, the sensed cathode current is applied to a common connection of the collector and emitter electrodes of a pair of transistors connected in a cascode amplifier configuration.

A method of applying gamma correction to a kinescope, in accordance with the invention, comprises the steps of: (i) linearly amplifying a video input signal to provide a linearly amplified video output signal; (ii) coupling the output of the amplifier to the cathode of the kinescope and concurrently sensing the cathode current to provide an output current linearly related to the cathode current and not linearly related to the output voltage of the amplifier; and (iii) applying at least a portion of the sensed cathode current of the kinescope to a circuit node in the linear amplifier for imparting gamma correction to images produced by the kinescope.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 3:
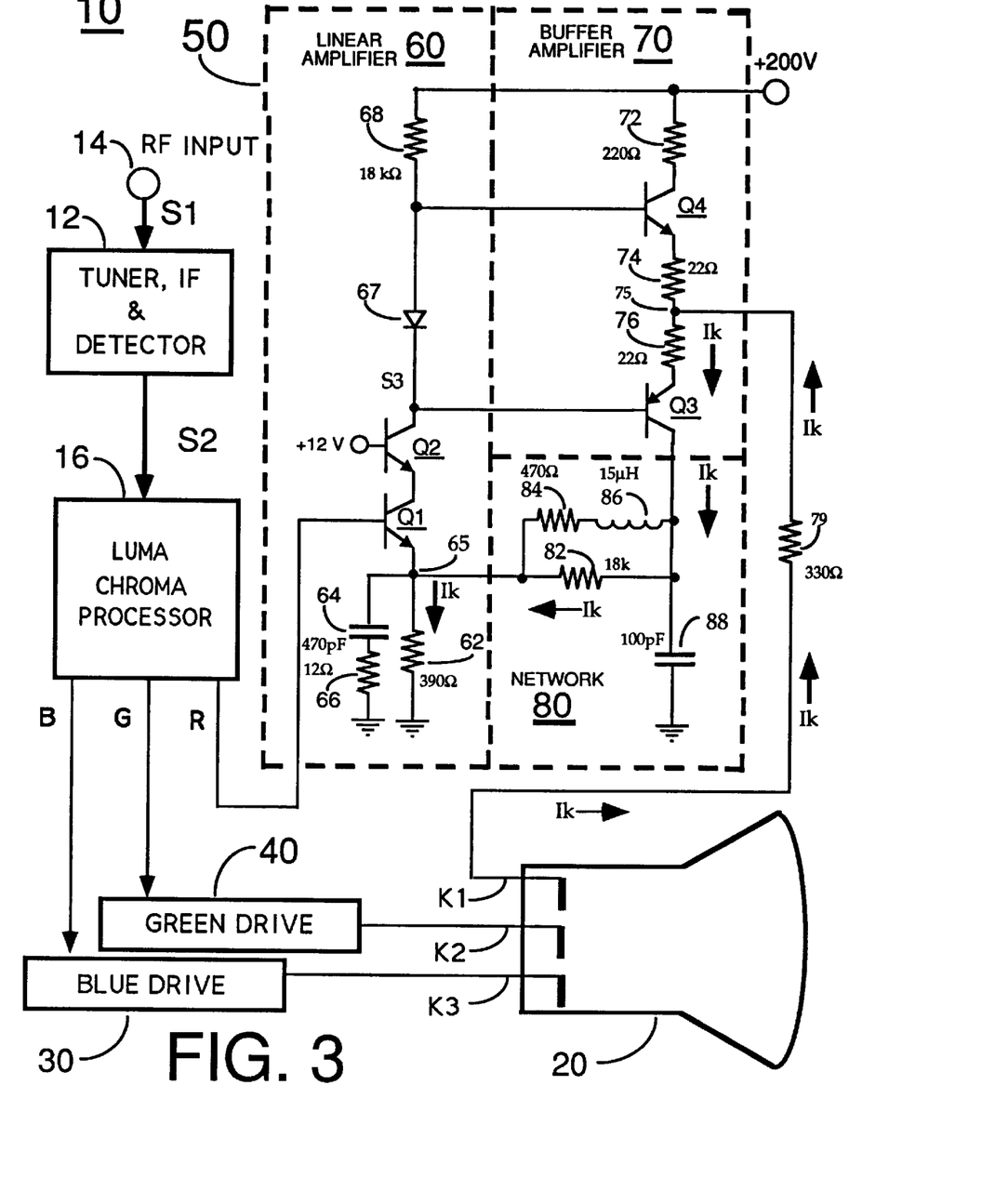
FIG. 3 is a block diagram, partially in schematic form, of a television receiver including a gamma corrected kinescope driver amplifier embodying the invention.

The television receiver 10 of FIG. 3 includes a tuner, intermediate frequency amplifier (IF) and detector unit 12 having an RF input terminal 14 for receiving an RF input signal S I from a suitable source (e.g., broadcast, cable, VCR or the like) and provides a base band video output signal S2 to a chrominance/luminance signal processing unit 16 that provides component red (R), green (G) and blue (B) video output signals for display by a kinescope 20. To provide high voltage drive signals to the cathodes K1, K2 and K3 of kinescope 20, the R, G and B drive signals are applied to respective ones of the kinescope cathodes K1, K2 and K3 via respective kinescope driver amplifiers 30, 40 and 50. The driver amplifiers are identical and so only the details of one (driver 50, outlined in phantom) are illustrated. For completeness, exemplary element values are included for each circuit element in this specific embodiment.

Driver amplifier 50, for purposes of illustration and explanation, is divided by phantom lines into three components comprising a linear amplifier 60, a buffer amplifier 70 and a feedback network 80.

As an overview of the principles of the invention, the amplifier 60 provides an amplified video signal S3 in response to the "red" (R) video input signal provided by processor 16. The buffer amplifier 70 includes a current sensor (comprising transistor Q3) which couples the output of the amplifier 60 to the cathode K1 of the kinescope 20 and provides (at the collector electrode thereof) an output current (Ik) linearly related to the cathode current of the kinescope 20. Network 80 includes a feedback path comprising resistor 84 in series with an inductor 86 which applies at least a portion of the output current provided by the cathode current sensor Q3 to a circuit node (65 in this embodiment of the invention, 63 in a later embodiment) in the amplifier 60 for imparting gamma correction to images provided by the kinescope 20.

In more detail, amplifier 60 comprises a first transistor Q1 and a second transistor Q2 connected in a cascode configuration, the first transistor Q1 having an emitter electrode coupled to a point of reference potential (ground) via a first resistor 62 and having a collector electrode connected to the emitter electrode of a second transistor Q2. The second transistor Q2 has a base electrode coupled to a source of reference potential (illustratively, +12V) and has a collector electrode coupled via a second resistor 68 to a source of relatively high supply voltage (illustratively, +200V), the second resistor providing a linearly amplified video output signal S3. A diode 67 is interposed between the second resistor 68 and the collector electrode of the second transistor Q2 for providing an offset voltage which is used to reduce cross-over distortion of the following buffer amplifier 70. High frequencies (e.g., at the upper end of the video frequency band) are boosted by means of a series connected resistor 66 and capacitor 64 coupled in parallel with the emitter resistor 62.

The buffer amplifier 70 comprises a pair of complementary transistors Q3 and Q4 having emitter electrode coupled via respective emitter resistors 74 and 76 to an output 75 and having base electrode coupled to respective ones of the cathode and anode electrodes of diode 67. The collector of transistor Q4 is coupled to the high voltage supply via a protection resistor 72 and the collector of transistor Q3 is coupled to network 80 for providing cathode current Ik thereto. the output 75 is coupled to the cathode K1 of kinescope 20 via a protection resistor 79.

The network 80 comprises a resistor 84 in series with an inductor 86 coupled between the collector of transistor Q3 and the circuit node 65 of amplifier 60 for applying the kinescope beam (cathode) current Ik to emitter resistor 62. The collector or transistor Q3 is coupled to ground via a capacitor 88 and is coupled to node 65 by a resistor 82. Inductor 86 and capacitor 88 serve to isolate high frequency discharge currents of the kinescope from the emitter resistor 62 to avoid negative feedback.

In operation, the feedback of the kinescope beam current Ik to the emitter of transistor Q 1 stabilizes the transconductance (gm) of driver amplifier 50 resulting in nearly perfect gamma correction.

Figure 2A:
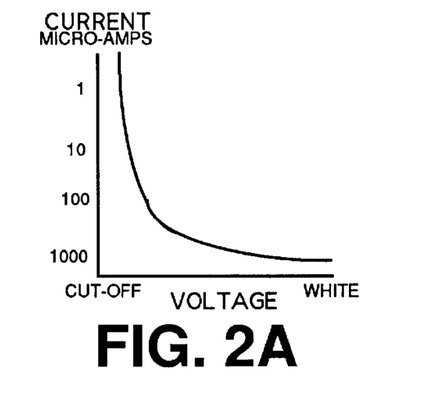
FIGS. 2A and 2B are diagrams illustrating non-linear cathode characteristics of a kinescope.
Figure 2B:
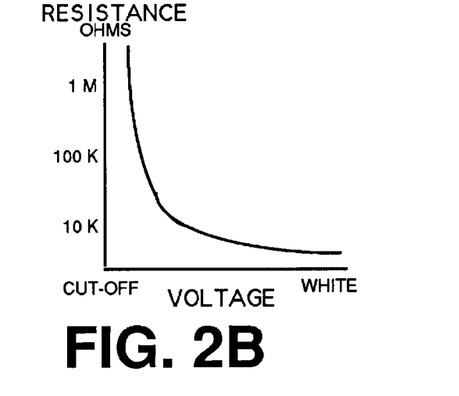

This may be more easily understood by considering, briefly, the non-linear characteristics of the kinescope illustrated in FIGS. 2A and 2B. From FIG. 2A it is seen that the kinescope beam (cathode) current is not a direct function of the cathode voltage. Instead, very small currents (a few micro-amps) are required for signals near cut-off (black level) and disproportionately large currents are required (hundreds of micro-Amps) for operation near white level. This non-linearity is more clearly shown in FIG. 2B which indicates the cathode resistance as a function of the cathode voltage. As seen, the resistance is very high (meg-Ohms) near beam cut-off, it decreases to a few tens of thousands of Ohms in the middle gray region and decreases to a few thousand Ohms near peak white.

The non-linear effect noted above represents the gamma of the picture tube and, as shown in FIG. 1, curve 102, is typically equal to about "3". This corresponds to a cubic relationship of voltage Vs current. In driver 50 of FIG. 3 the overall gamma (light input to light output) is reduced to about unity by feedback of the kinescope beam current. Beam current feedback results in non-linear voltage amplification of the red video signal R but linear current amplification. In other words, the amplifier 50 is biased for operation as a transconductance amplifier rather than a voltage amplifier. As the red video signal R changes, transistor Q 1 only supplies a current to node 65 equal to the difference between the actual beam current Ik and the emitter resistor current determined by dividing the red video signal R by the value of the emitter resistor 62. This difference is non-linear since the cathode impedance is non-linear as previously discussed. Advantageously, feedback of the actual cathode current of the kinescope as described above provides essentially perfect gamma correction because it forces the amplifier 60 to supply a current to the cathode proportional to the video input signal applied to the amplifier input even though the cathode dynamic impedance varies as a function of the cathode current. By this means, the kinescope beam current is made proportional to the video input signal regardless of the actual value of the cathode voltage at any particular brightness level.

Figure 4:
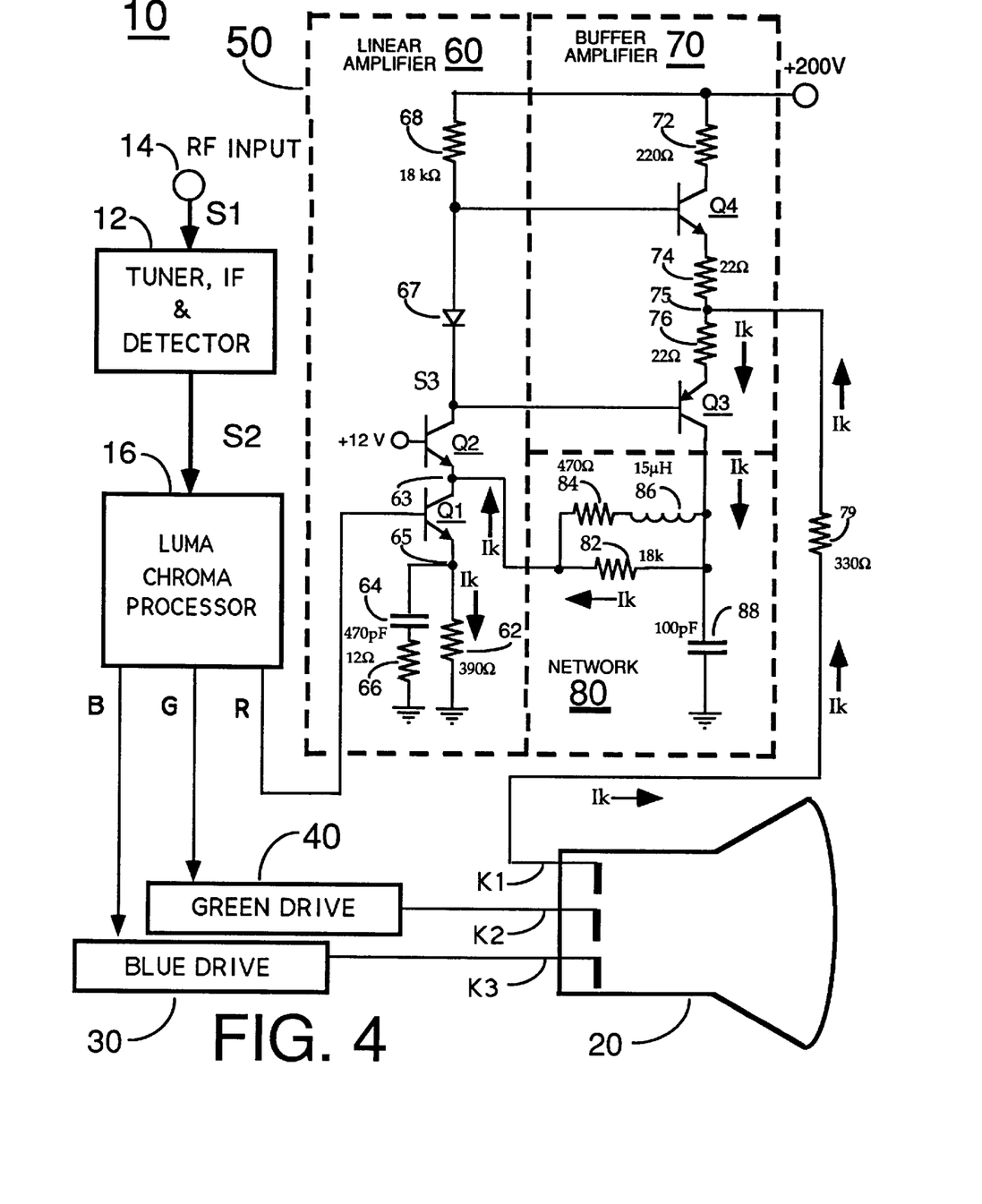
FIGS. 4 and 5 are block diagrams, partially in schematic form, illustrating modifications of the kinescope driver apparatus of FIG. 3.

The receiver 10 of FIG. 3 may be modified as shown in FIG. 4 with regard to application of the feedback kinescope beam (cathode) current to the emitter resistor 62. In FIG. 3 the beam current Ik is applied to node 65 which connects directly to resistor 62. In FIG. 4 the feedback of beam current is to a node 63 which is coupled to the common connection of the collector of transistor Q1 and the emitter resistor of transistor Q2. This change does not alter the operation of the amplifier since virtually all the beam current still flows through the emitter resistor 62 and produces the same voltage bias component at the emitter of transistor Q1. It will be noted that the emitter of transistor Q2 is also a low impedance point and so the collector voltage of transistor Q1 will not be altered by the beam current flow. Thus, applying the current Ik to node 63 will not interfere with the Miller effect suppression provided by the cascode transistor Q2.

Figure 5:
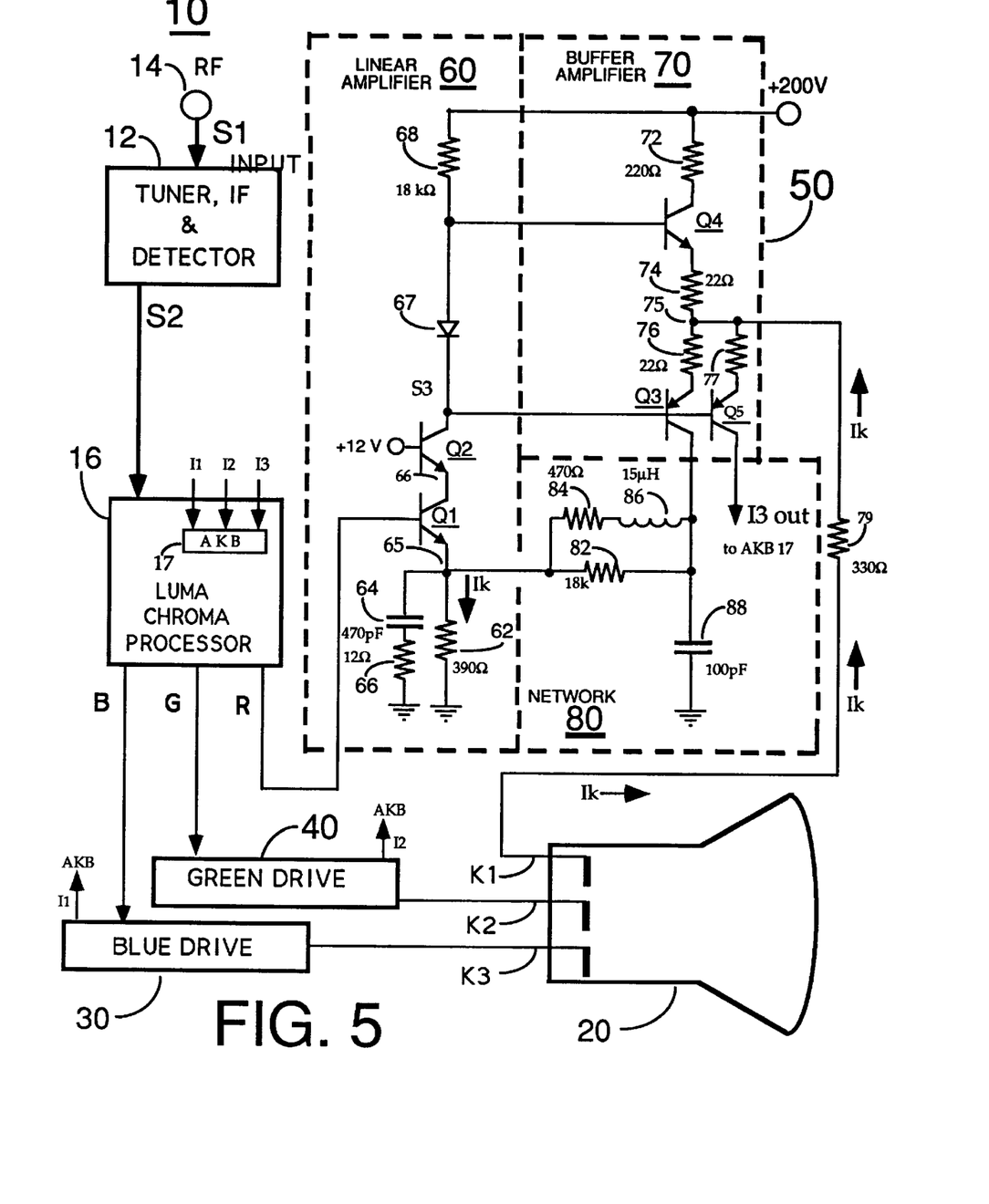

The example of FIG. 3 may also be modified, as shown in FIG. 5, for providing an AKB control current. The usual approach to providing an automatic kinescope bias (AKB) control current is to couple a current sensing transistor between the driver amplifier and the cathode electrode. In FIG. 5, the buffer amplifier 70 provides sensing for both gamma correction and AKB control. Specifically, in amplifier 70 an additional PNP transistor Q5 and emitter resistor 77 is provided in parallel with transistor Q3 with the output current of the added transistor Q5 being applied to automatic kinescope bias control circuitry 17 in the luminance chrominance signal processor 16. The other drive units 30 and 40 are similarly modified to provide AKB current from all three drivers.

Figure 6A:
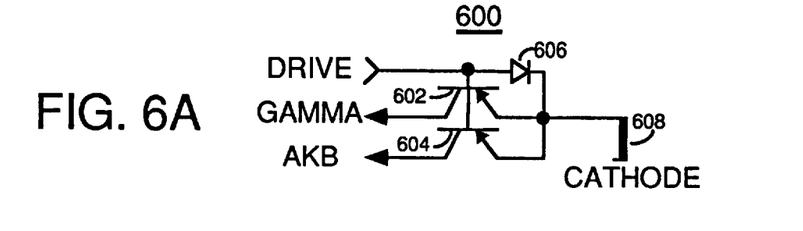
FIGS. 6A and 6B are block diagrams, partially in schematic form, illustrating alternative current splitters suitable for use in the present invention.
Figure 6B:
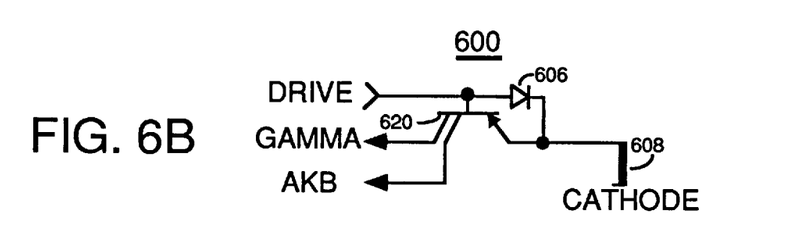

FIGS. 6A and 6B illustrate alternative current splitters for providing gamma sensed current and AKB sensed current. The cathode current sensor 600 of FIG. 6A includes a pair of PNP transistors 602 and 604 having base electrodes connected to receive a source of drive signal (DRIVE) and having emitter electrodes connected to the cathode 608 of a kinescope. A diode 606 is provided in parallel with the transistor base-emitter junctions to provided a path for reverse current flow. Reverse current flows, illustratively, during blanking to charge the stray capacitance associated with the cathode electrode. In operation the cathode current is split into a gamma correction component at the collector of transistor 602 and a AKB component at the collector of transistor 604. In integrated circuit manufacture it is possible to provide a transistor with two collector electrodes. FIG. 6B illustrates a modification of the example of FIG. 6A in which transistors 602 and 604 are replaced by a double collector transistor 620 which provides output gamma and AKB currents in proportion to the respective collector areas of the transistor 620.

Figure 7:
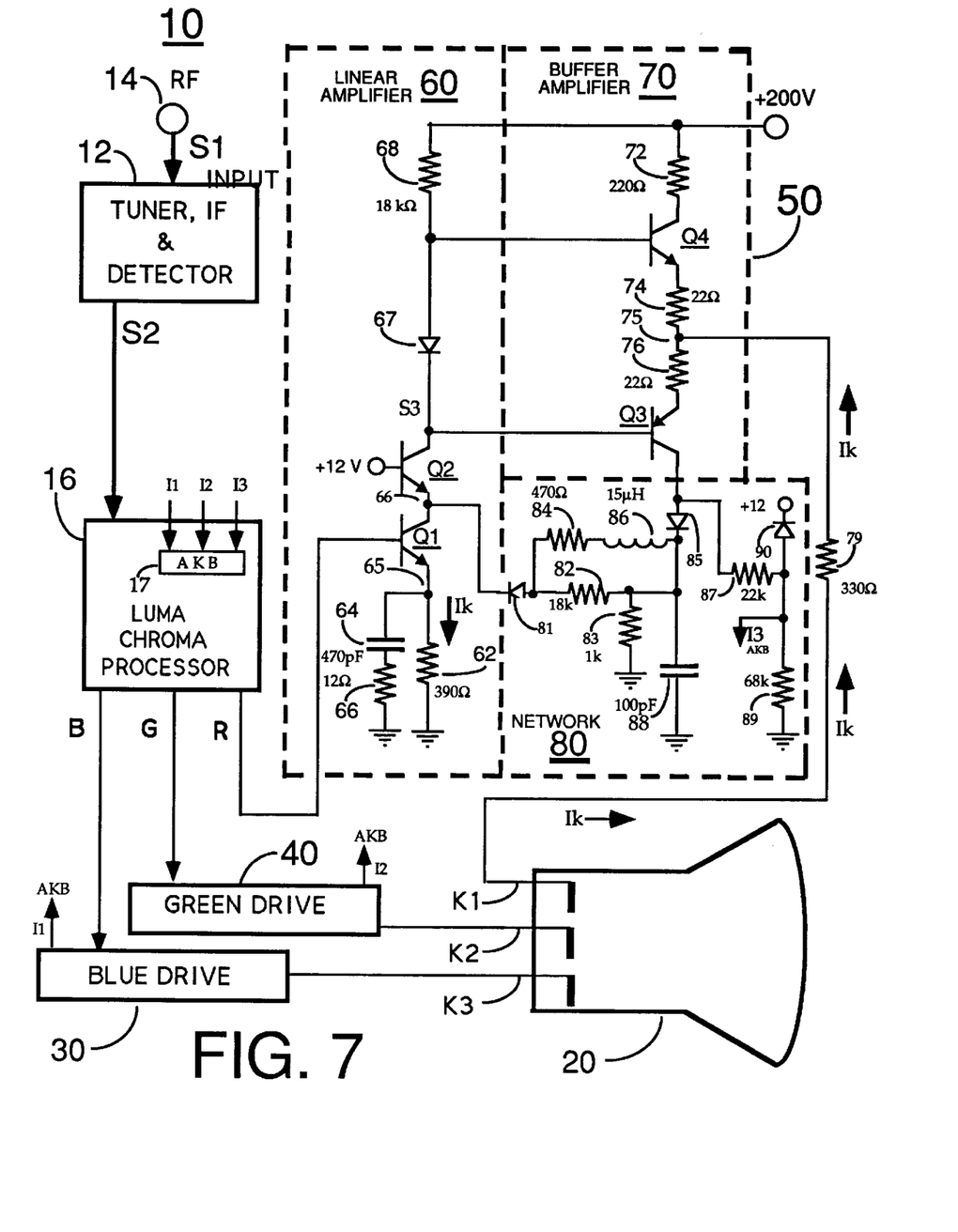
FIG. 7 is a block diagram, partially in schematic form, illustrating a modification to the example of FIG. 4 for providing current sensing for both gamma correction and AKB control.

In FIG. 7 the AKB and gamma control currents are obtained without need for dual transistors (as in the examples of FIGS. 5 and 6A) and without need for dual collector transistors (as in the example of FIG. 6B). The modification comprises adding a diode 81 between the output of network 80 and circuit node 66, adding a resistor 83 in parallel with capacitor 88, adding a diode 85 between the collector of transistor Q3 and the input of network 88, coupling the collector of transistor Q3 to a source of positive supply voltage ( +12v) by a series connected resistor 87 and diode 90 and coupling the common connection of resistor 87 and diode 90 to a source of reference potential (ground) via a further resistor 89. For completeness, exemplary element values are provided by each circuit element.

In operation, the AKB output current I3 for AKB circuit 17 is produced at the common connection of resistors 87 and 89 and diode 90. For relatively low values of the kinescope cathode current Ik (e.g., on the order of about 150 micro-Amps or so) the voltage across resistors 87 and 89 is lower than 12 volts and the feedback network 80 is disabled by reverse biasing of diode 85. For this condition, the sampled current flows entirely into the AKB circuit 17. For higher cathode currents, the diode 85 starts conducting and the current feedback starts functioning as previously described. Resistor 83 has been added to provide a discharge path for capacitor 88 to avoid potential smearing effects.

What is claimed is:

1. Kinescope driver apparatus, comprising:
    an amplifier (60) comprising first (Q1) and second (Q2) transistors connected in a cascode configuration, the first transistor having a base electrode for receiving a video input signal, having an emitter electrode coupled to a point of reference potential via a first resistor (62) and having a collector electrode connected to the emitter electrode of said second transistor, said second transistor having a base electrode coupled to a source of reference potential (+12V) and having a collector electrode coupled via a second resistor (68) to a source of relatively high supply voltage, said second resistor providing a linearly amplified video output signal at said collector electrode of said second transistor;

a kinescope (20) having a cathode electrode (K1) coupled to said second resistor (68) for producing images representative of said video input signal; and circuit means (Q3, 82), coupled between said cathode electrode of said kinescope and a selected electrode of said first transistor, for applying a given portion of cathode current (Ik) conducted by said cathode electrode (K1) of said kinescope (20) to said selected electrode; and wherein said circuit means comprises a buffer amplifier (70) coupled between said second resistor and said cathode electrode; and a resistor (82) connected between a current output of said buffer amplifier and said selected electrode of said first transistor.

2. Kinescope driver apparatus, comprising:

an amplifier (60) comprising first (Q1) and second (Q2) transistors connected in a cascode configuration, the first transistor having a base electrode for receiving a video input signal, having an emitter electrode coupled to a point of reference potential via a first resistor (62) and having a collector electrode connected to the emitter electrode of said second transistor, said second transistor having a base electrode coupled to a source of reference potential (+12V) and having a collector electrode coupled via a second resistor (68) to a source of relatively high supply voltage, said second resistor providing a linearly amplified video output signal at said collector electrode of said second transistor;

a kinescope (20) having a cathode electrode (K1) coupled to said second resistor (68) for producing images representative of said video input signal; and circuit means (Q3, 82), coupled between said cathode electrode of said kinescope and a selected electrode of said first transistor, for applying a given portion of cathode current (Ik) conducted by said cathode electrode (K1) of said kinescope (20) to said selected electrode; and wherein said circuit means comprises a PNP transistor (Q3) having an emitter electrode connected to said cathode (K1) of said kinescope, having a base electrode connected to said second resistor (68) of said amplifier (60) and having a collector electrode connected to said emitter electrode of said first transistor.

3. Kinescope driver apparatus, comprising:

an amplifier (60) comprising first (Q1) and second (Q2) transistors connected in a cascode configuration, the first transistor having a base electrode for receiving a video input signal, having an emitter electrode coupled to a point of reference potential via a first resistor (62) and having a collector electrode connected to the emitter electrode of said second transistor, said second transistor having a base electrode coupled to a source of reference potential (+12V) and having a collector electrode coupled via a second resistor (68) to a source of relatively high supply voltage, said second resistor providing a linearly amplified video output signal at said collector electrode of said second transistor;

a kinescope (20) having a cathode electrode (K1) coupled to said second resistor (68) for producing images representative of said video input signal; and circuit means (Q3, 82), coupled between said cathode electrode of said kinescope and a selected electrode of said first transistor, for applying a given portion of cathode current (Ik) conducted by said cathode electrode (K1) of said kinescope (20) to said selected electrode; and wherein said circuit means comprises a PNP transistor (Q3) having an emitter electrode connected to said cathode (K1) of said kinescope, having a base electrode connected to said second resistor (68) of said amplifier (60) and having a collector electrode connected to said collector electrode of said first transistor.

4. Kinescope driver apparatus, comprising:

an amplifier (60) comprising first (Q1) and second (Q2) transistors connected in a cascode configuration, the first transistor having a base electrode for receiving a video input signal, having an emitter electrode coupled to a point of reference potential via a first resistor (62) and having a collector electrode connected to the emitter electrode of said second transistor, said second transistor having a base electrode coupled to a source of reference potential (+12V) and having a collector electrode coupled via a second resistor (68) to a source of relatively high supply voltage, said second resistor providing a linearly amplified video output signal at said collector electrode of said second transistor;

a kinescope (20) having a cathode electrode (K1) coupled to said second resistor (68) for producing images representative of said video input signal; and circuit means (Q3, 82), coupled between said cathode electrode of said kinescope and a selected electrode of said first transistor, for applying a given portion of cathode current (Ik) conducted by said cathode electrode (K1) of said kinescope (20) to said selected electrode; and means for apportioning said cathode current into said given portion for application to said selected electrode of said first transistor and into a further portion for application to an automatic kinescope bias circuit.

* * * * *